United States Patent Office 2,698,005
Patented Dec. 28, 1954

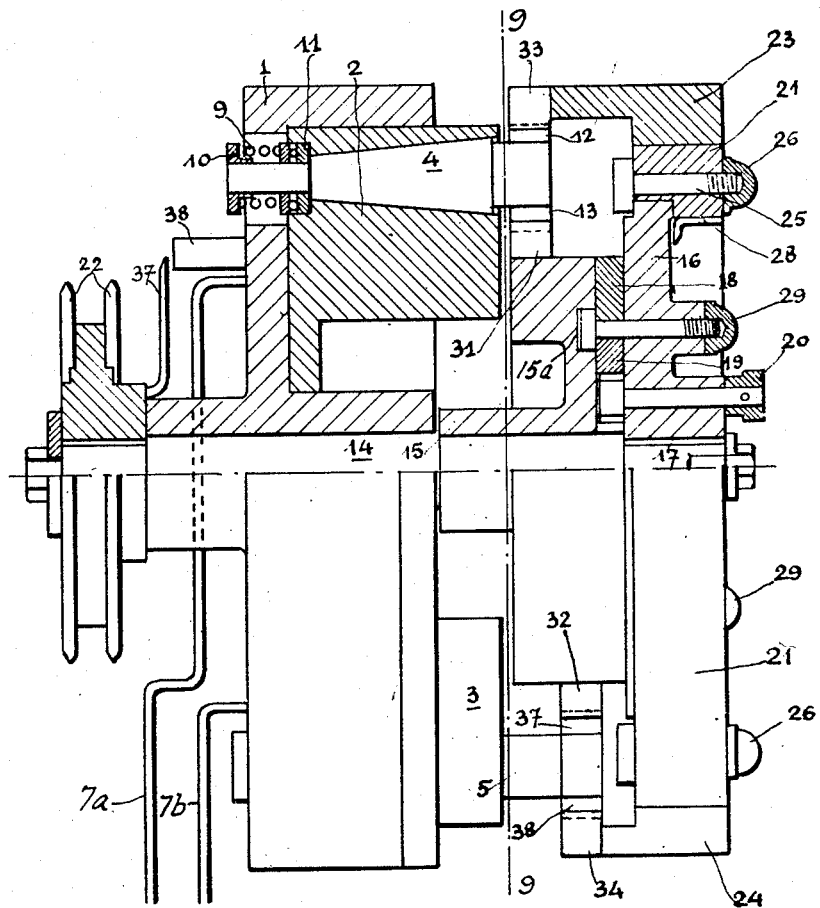

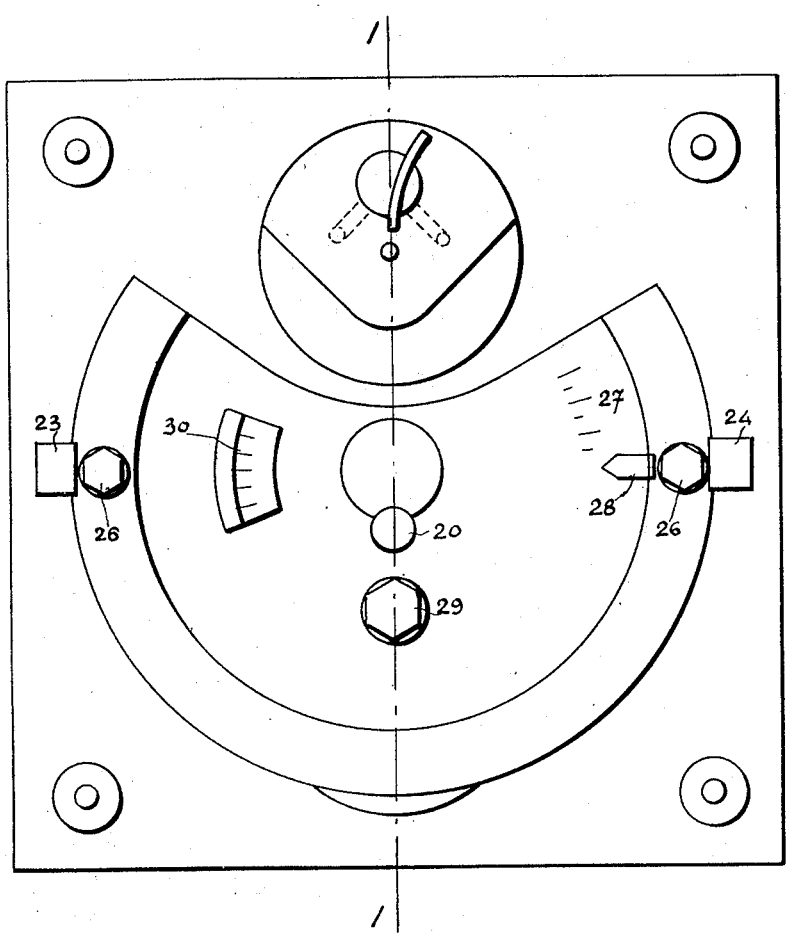

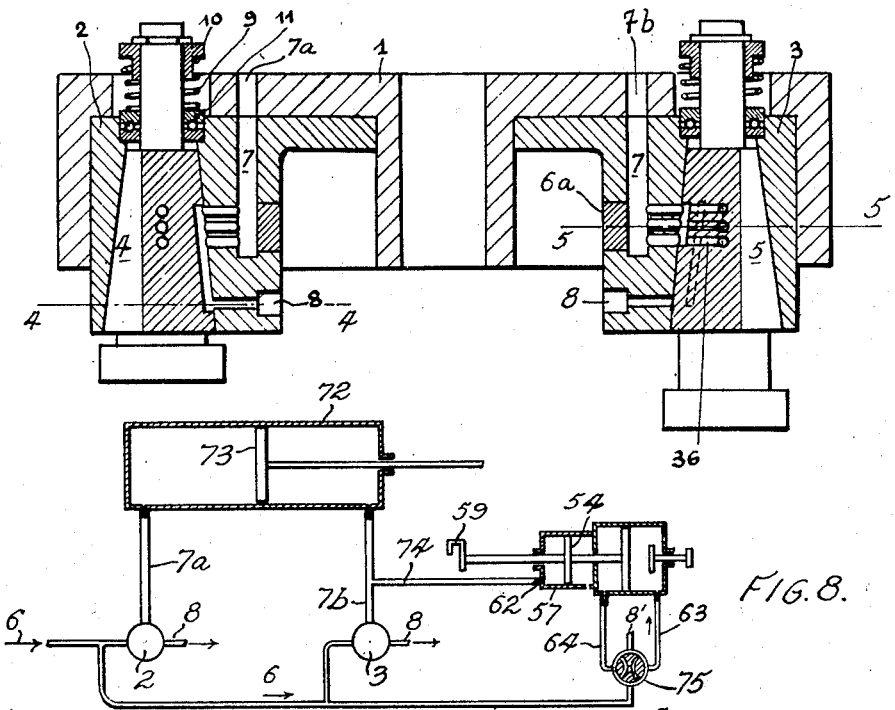
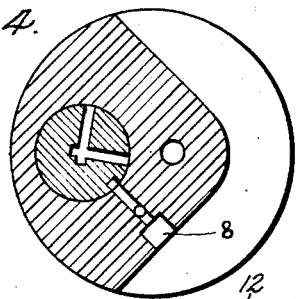
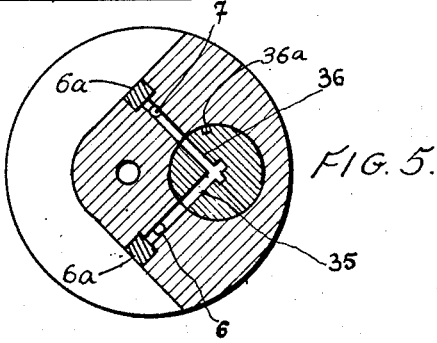
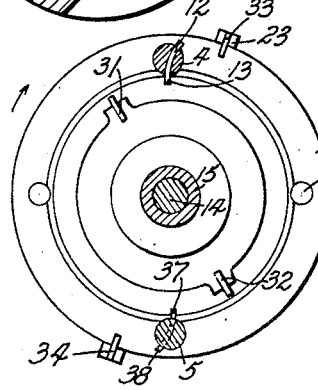

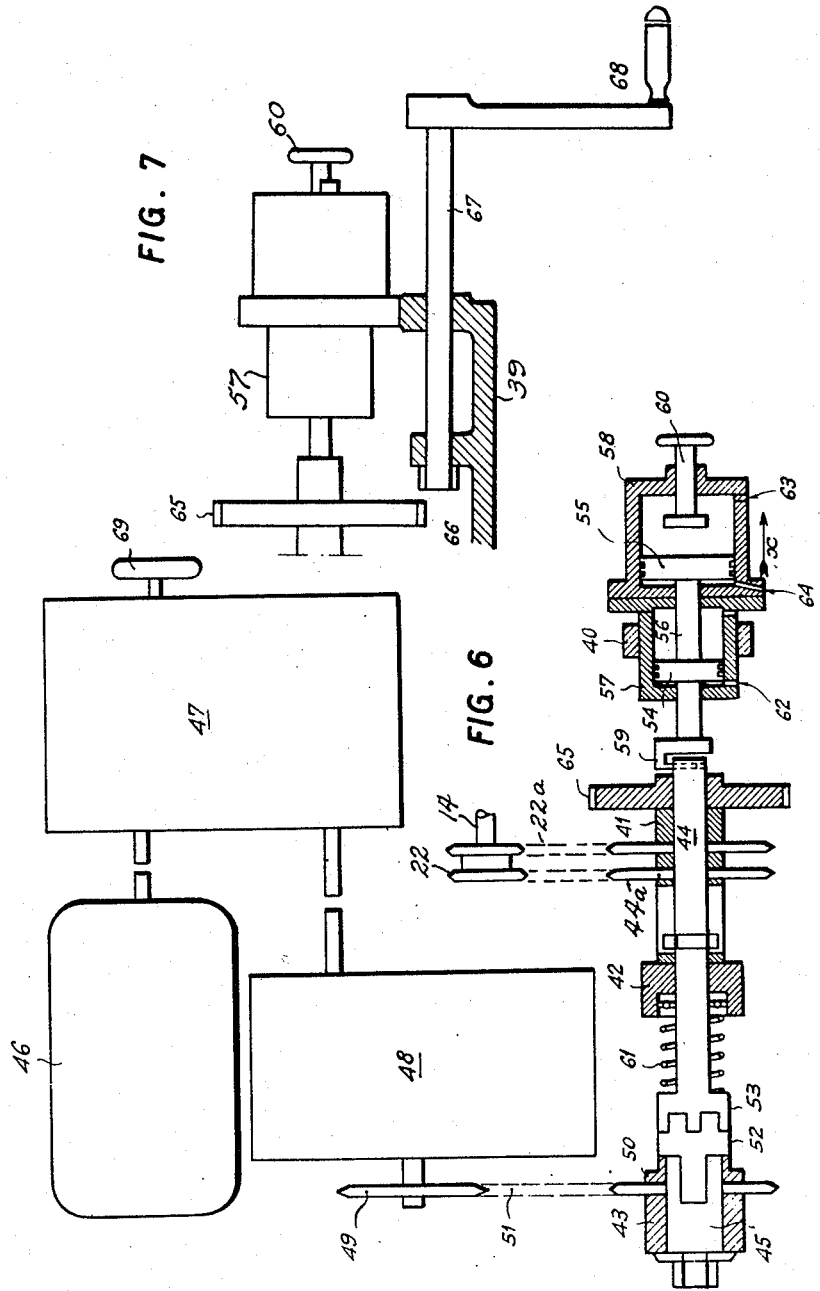

2,698,005

REMOTE CONTROL FOR SERVO MECHANISMS EMPLOYING PERIODICALLY ACTUATED VALVES

Pierre Fouron, Chateau-Malabry, and Georges Bourret, Boulogne-sur-Seine, France, assignors to Société dite: Société Civile d'Etudes pour Materiel de Fonderie, Bagneux (Seine), France Application September 20, 1950, Serial No. 185,782

Claims priority, application France September 24, 1949

14 Claims. (Cl. 121—38)

The present invention relates to a remote-control mechanism in which a fluid under pressure is employed as the driving medium. This mechanism comprises a member to which there is imparted a continuous rotational movement and which can thus be regarded as a time-metering member. This member has the object of actuating, at instants and for periods of time which are adjustable at will, the distributor (or distributors) of a servo-motor (or servo-motors) which, through the medium of a fluid under pressure, can thus control from a distance the actuation of a member or members, for example, a machine-tool. The invention is directed to a remote control mechanism for a compressed fluid motor, the mechanism comprising a continuously driven shaft maintained at a constant speed and driving at least two plates or bed-like members having abutments thereon periodically engageable with other abutments on a pair of rotatable distributors to actuate same. Thus, at one time, pressure is supplied to the motor through one distributor and is exhausted therefrom through the other. After a predetermined interval, pressure is supplied through the second distributor and exhausted through the first. The motor will preferably be a servo-motor of the double-acting cylinder type There may be provided as many servo-motors as there are members to be actuated in the controlled machine and functions to be performed. All the distributors of these servo-motors and the time-metering mechanisms thereof may be located at a distance from the machine which they control, so as to form a type of mechanical brain directing the said machine.

In practice at each distributing station the time-metering mechanism drives a rotatable plate on which abutment members, located at different distances from the axis of rotation, can be angularly adjusted. The said abutment members co-operate with diametrical abutments associated with the distributor of the corresponding servo-motor, so as to displace the latter alternately from its opened position to its closed position and vice versa. Consequently, according to the adjustment of the displaceable abutments, it is possible to produce at a predetermined instant and for a predetermined period of time the actuation and the stopping of the corresponding servo-motor. The shaft may carry several pairs of plates and the abutments provided on each pair engage the abutments of a pair of distributors associated with the predetermined motor. Thus there will be provided as many pairs of plates as there are motors. The several pairs of plates are fixed on the rotatable shaft for adjustment and the position of the plates of one pair with respect to each other is also adjustable. Therefore, the duration and time of operation of each motor in a predetermined cycle is very easily adjustable.

By way of example only, in the accompanying drawings:

Figures 1 and 2 show respectively in front elevation and in cross-section on the line 1—1 of Figure 2, an embodiment of distributor according to the present invention;

Figures 3, 4 and 5 are sections along two perpendicular planes through the cocks provided in the distributor (Figures 1 and 2), said two cocks occupying equidistant positions from the axis of the distributor; and Figures 6 and 7 are plan views, both partly in elevation and partly in section, showing the system by which the distributors are actuated in point of time.

Figure 8 shows a schematic view of a typical use of the novel distributor.

Figure 9 shows a cross-section view of Figure 1 taken on the lines 9—9.

In the embodiment which will now be described, two control mechanisms constructed in accordance with the present invention are combined in a common frame. The control members, which are dependent upon the time-metering member, are arranged coaxially. It will nevertheless be obvious that these mechanisms could be separate from one another or be differently combined.

The double mechanism comprises a frame 1 on which are mounted two distributing cock bodies 2, 3, in each of which a plug 4, 5 is arranged to turn. These distributor cocks could be replaced by flat slide valves or any other known means for producing the controlled flow of the fluid or for intercepting the delivery thereof. In the case selected, the plugs 4, 5 are provided with suitably located grooves or holes by means of which it is possible either to direct compressed air from an air admission duct 6 through a duct 7 to the machine to be controlled, or to discharge the air from the machine through an exhaust hole 8. Each plug 4, 5 is maintained in close contact with its seat by means of a calibrated spring 9 interposed between an abutment 10 and a ball thrust bearing 11. Lubrication is provided by greasing conduits 70, closed by plugs 71, as best seen in Figure 4 Rotation of the plugs is controlled by pairs of abutments 12, 13 and 37, 38. The details of the distributor cocks 2 and 3 are best understood by reference to Figures 3, 4 and 5. In Figure 3, the distributor cock 2 is shown positioned to exhaust the controlled machine, while the distributor cock 3 is positioned to supply pressure to the machine to be controlled via lines 7 and 7b (note Figure 8) and the cylinder 57 via line 74. The two cocks 2 and 3 are identical. The plug 4 (or 5) is provided with three pairs of intersecting passageways 35 and 36. A longitudinally extending groove 36a is formed on the outer periphery of the plug. The cock body 2 (or 3) is provided with a longitudinal passageway 7 which is connected into the valve seat by three passageways (not numbered) as seen in Figure 3. For convenience in construction a groove may be formed in the side of the cock body to facilitate the drilling of the unnumbered passageways. This groove is closed, in operation, by the seals 6a. An exhaust passageway 8 is provided in the cock body. A comparison of Figures 4 and 3 will make clear that with the plug 5 positioned as shown, the groove 36a connects the passageway 7 with passageway 8 and hence will exhaust passageway 7 to the atmosphere. At this time the other plug 4 is positioned to supply pressure to its passageway 7 from pressure source 6 via passageways 35 and 36. A shaft 14 is arranged to rotate freely at the centre of of the frame 1 and is driven, for example, by means of sprocket wheels 22 and a chain or by any other means. It will readily be seen that, since the axes of the plugs 4, 5 are parallel to the axis of the shaft 14, the abutments 12, 13, 37 and 38 can be operated by levers connected together in pairs, which are driven by the shaft 14 in its rotation and the radial lengths of which are different. The radial distances of the abutments 12, 38 and 13, 37 from the axis will also be different.

At that end of the shaft remote from the sprocket are mounted two plates 15 and 16. One plate 15 is loose on the shaft 14, while the other plate 16 is fixed to said shaft 14 by a key 17. Secured to the plate 15 by means of screws not shown are two annuli 18 and 19, the annulus 19 being internally toothed and meshing with a pinion which is arranged to be actuated from the outside by means of a knob 20, the axis of which is parallel to the axis of the shaft 14. Between the annuli 18 and 19 there is provided an annular space through which extend bolts on which are screwed nuts 29. The heads of the bolts are positioned within an annular groove 15a in plate 15. The three parts 15, 18 and 19 can be angularly displaced about the shaft 14 after loosening nuts 29 by rotating the knob 20, the pinion thus turning the whole assembly to bring it into the required position indicated on a scale 30. The plate 15, furthermore, has two abutments 31 and 32.

Disposed on the periphery of the plate 16 is an annulus 21 to which are secured two members 23 and 24 carrying abutments 33 and 34. The three members 21, 23 and 24 can be made fast with the plate 16 by bolts 25 and nuts 26. In order to turn this assembly angularly, the nuts 26 are loosened and it is moved to bring the pointer 28 to the required position indicated on the scale 27. By means of the angular adjustments, the abutment pairs 31, 32, and 33, 34 can be fixed at any desired angular position relative to each other. Since both of these abutment pairs, in operating condition, are fixed relative to each other and the rotating driving shaft 14, it is seen that a predetermined time interval may be obtained between the passage of abutment 31 or 32 past a given radial line and the passage of abutment 33 or 34 past this same radial line.

The operation of this control mechanism is then as follows:

Assume that the abutments 31, 32, 33 and 34 have been adjusted and clamped into a position such as illustrated in Figure 9. For purposes of illustration, it will be assumed that the distributor plug 4 in Figure 9 which is mounted in distributor 2 (note Figure 9), is in a position which connects a pressure source 6 (Figure 8) to line 7a. At this time, the distributor plug 5, which is in distributor 3 of Figure 9, will be in a position which connects the line 7b with an exhaust 8.

As the plate 15 and annulus 21 rotate clockwise as in Figure 9, the abutment 31 on plate 15 will come into contact with abutment 12 on plug 4. Continued rotation of the shaft 14 will carry abutment 31 past abutment 12, thus causing plug 4 to rotate counterclockwise on its seat. Since abutments 31 and 32 are diametrically opposed, a similar rotation is simultaneously imparted to plug 5 by the engagement of abutments 32 and 38. The rotation of the plug 4 will now position the plug to connect line 7a (Figure 8) with the exhaust 8, while the rotation of plug 5 has simultaneously connected pressure line 6 to line 7b, thus causing the piston in cylinder 72 to move to the left.

Continued clockwise rotation of the shaft will bring the abutment 34 into contact with the upper end of the abutment 12 of plug 4. As the abutment 34 is carried past the plug 4, the engaging abutments cause the plug 4 to rotate clockwise and plug 4 is returned to its original position. A similar action takes place simultaneously with abutments 33 and 38. The connections in Figure 8 are now as they originally were, with lines 6 and 7a connected to conduct fluid under pressure to the left hand face of the piston while the line 7b is connected to the exhaust, thus causing the piston to return to its original position.

The outlet apertures 8 may be provided with adjustable needle valves to permit more or less rapid evacuation of the machine.

One complete rotation of the shaft 14 driving the aforesaid control members enables the apparatus to complete its work in a predetermined cycle. The commencement of the cycle is indicated by, for example, registering a pointer 37a with a mark 38a. Each distributor forms a control element, and as many control elements are provided for one machine as there are machines to be operated.

As already stated, the distributing arrangements may be secured to a panel with its control mechanism and this assembly may be located at any distance from the automatic machine, for example in an office or in independent premises The shafts 14 are actuated by a mechanism to which a predetermined speed of rotation is imparted and which consequently functions as a time-metering arrangement. This mechanism may, for example, comprise a frame 39 supporting a number of bearings 40, 41, 42 and 43 in which are journalled two shafts 44, 45, the axes of which are in alignment with one another. The driving shaft 45 is continuously rotated by a motor 46 through a variable-speed gear 47 and a reduction gear 48, the latter being coupled to the said shaft 45 by sprocket wheels 49, 50 and chain 51. The shaft 44 is displaceable axially and can consequently be disconnected from the driving shaft 45 when dog clutch members 52, 53 are separated from one another.

The translational movements of the shaft 44 are produced by two pistons 54 and 55 of different diameters, which are fixed on a common rod 56 and mounted in two cylinders 57 and 58. The rod 56 carries at its end a dog 59 which connects said rod to the shaft 44. An adjustable and movable abutment 60 is provided for limiting the stroke of the pistons 54, 55. A spring 61 tends to maintain the shaft 44 in driven engagement with the shaft 45. Two toothed wheels 44a connect through chains with the sprocket wheels 22 of the distributors hereinbefore described.

In Figure 8 one exemplary employment of the novel distributor is illustrated. The distributor bodies 2 and 3 have their passageways 7 connected respectively to lines 7a and 7b. 7a and 7b are connected to a servo cylinder 72 in which is provided a piston 73 which may be connected to a device to be controlled. Line 7b is further connected, via line 74 to orifice 62. (Compare Figures 6 and 8.) Pressure source 6 is connected to each distributor cock and is further connected to a conventional type of manually operated valve 75. The manually operated valve 75 in turn is provided with lines 63, 64 and an exhaust port 8'.

Assume, as before, that at this moment the cock 2 is positioned to exhaust line 7a and cock 3 is positioned to supply pressure to line 7b. Since line 7b is under pressure, pressure will be transmitted, via line 74 to cylinder 57, and force piston 54 to the right until it abuts the stop 60. Referring to Figure 6, it will be noted the movement of piston 54 to the right will pull the shaft 44 to the right and disengage the clutch 52, 53 Disengagement of the clutch disconnects the wheels 44a from the driving shaft 45, thus preventing further rotation of shaft 14, which is driven by 44a—22a—22. Thus, the rotating abutments 31, 32 and 33, 34 are stopped and the piston 72 is held in its most leftward position. In order to start the device into operation again, the manually operated valve 75 is turned to a position which will connect pressure source 6 with line 63. This pressure acts against the right hand side of the large area piston 55. Since the area of piston 55 is greater than the area of piston 54, the assembly 55—56, 54—44 will be forced to the left, thus engaging the clutch and connecting the driving shaft 45 to the driven shaft 14. The driven shaft 14 will then be rotated one revolution to complete a cycle in which the piston 72 is held at its extreme leftward position for a predetermined time, then, upon actuation of the distributors by the next abutments to pass them, moved to its extreme rightward position, held there until the next set of abutments pass the distributors, and finally returned to its extreme leftward position and halted upon the next actuation of the distributors.

If, owing to breakdown, the mechanism stops during a cycle, it may be necessary nevertheless to terminate this cycle and to substitute a manual control for the mechanical control. For this purpose, the abutment 60 is given a half-turn and is completely pulled out. The driving fluid is then directed to the cylinder 58 through the orifice 64, which has the effect of moving the shaft 44 in the direction of the arrow x. In this movement, the shaft 44 is disengaged and a toothed wheel 65 comes into engagement with a pinion 66 fast on a shaft 67. By means of a crank 68 located at the end of this shaft, the shafts 67 and 44 can be manually turned and thus drive the distributors. With this mechanism it is possible to terminate the cycle of operations.

In order to set the mechanical control arrangement into operation again, the fluid is admitted to the cylinder 58 at 63, the orifice 64 being connected for exhaust. Normal operation can be resumed when the abutment 60 has been returned to the initial position shown in Figure 6.

The duration of the cycle, which corresponds to the speed of rotation of the whole assembly, may be increased or decreased by means of the variable-speed gear 47, adjustment being effected by means of the handwheel 69, for example.

We claim:

1. In a mechanism for the remote control of a servomotor of the double acting type, a shaft, means continuously driving said shaft at a predetermined constant speed, plate means coaxial with and secured to said shaft so as to be rotated thereby, distributor means mounted for regular movement about an axis parallel to that of the shaft and through which fluid under pressure is supplied to and exhausted from the servo-motor, abutment means on said distributor means, a first abutment on said plate means engageable with said abutment means on said distributor means so as to move the latter to a position in which it supplies fluid to one side of the servo-motor and exhausts fluid from the other side thereof, and a second abutment on said plate means also engageable with the abutment means on said distributor means so as to move the latter to a position in which the direction of fluid movement through the distributor means is reversed.

2. In a mechanism for the remote control of a servo-motor of the double acting type, a shaft, means continuously driving said shaft at a predetermined constant speed, plate means coaxial with and secured to said shaft so as to be rotated thereby, distributor means mounted for angular movement about an axis parallel to that of the shaft and through which fluid under pressure is supplied to and exhausted from the servo-motor, a pair of abutments on said distributor means, a first abutment on said plate means engageable with one of the abutments of the distributor means so as to move the latter to a position in which it supplies fluid to one side of the servo-motor and exhausts fluid from the other side and a second abutment on said plate means engageable with the other one of the abutments on said distributor means so as to move the latter to another position in which the direction of fluid movement through the distributor means is reversed.

3. In a mechanism for the remote control of a servo-motor of the double acting type, a shaft, means continuously driving said shaft at a predetermined constant speed, plate means coaxial with and secured to said shaft so as to be rotated thereby, a pair of distributors mounted for angular movement about spaced axes parallel to that of the shaft and through each of which fluid under pressure is respectively supplied to and exhausted from the servo-motor, a pair of abutments on each distributor, a first pair of abutments on said plate means respectively engageable with one of the abutments of the distributors so as to move said distributors concurrently to positions in which one of them supplies fluid to the servo-motor and the other exhausts fluid therefrom, and a second pair of abutments on said plate means respectively engageable with the other one of the abutments on each distributor so as to move said distributors concurrently to other positions in which the direction of fluid movement through the distributor is reversed.

4. In a mechanism for the remote control of a servo-motor of the double-acting piston type, a shaft, means continuously driving said shaft at a predetermined constant speed, a pair of plates coaxial with and secured to said shaft so as to be rotated thereby, a pair of distributors mounted for angular movement about spaced axes parallel to that of the shaft and through each of which fluid under pressure is respectively supplied to and exhausted from the servo-motor, a pair of opposed abutments on each distributor, a pair of abutments on one of said plates respectively engageable with one of the abutments on the distributors so as to move said distributors concurrently to positions in which one of them supplies fluid to the servo-motor and the other exhausts fluid therefrom, and a pair of abutments on the other of said plates respectively engageable with the other one of the abutments on each distributor so as to move said distributors concurrently to other positions in which the direction of fluid movement through the distributors is reversed.

5. In a servo-motor remote control mechanism as claimed in claim 4, means for varying the angular position of the pairs of abutments on each plate in relation to the driving shaft.

6. In a mechanism for the remote control of a servo-motor of the double-acting piston type, a shaft, means for continuously driving said shaft at a predetermined constant speed, a first plate co-axial with and loose on the shaft, a second plate also co-axial with the shaft and fixed thereto, means interconnecting said two plates to enable the first plate to be secured to the second plate in angularly adjusted relation thereto, a pair of distributors mounted for angular movement about spaced axes parallel to that of the shaft and through each of which fluid under pressure is respectively supplied to and exhausted from the servo-motor, a pair of opposed abutments on each distributor, a pair of abutments fixed to and projecting outwardly from the periphery of said first plate and respectively engageable with one of the abutments on the distributors so as to move said distributors concurrently to positions in which one of them supplies fluid to the servo-motor and the other exhausts fluid therefrom, and a pair of abutments mounted on the second plate for angular adjustment in relation to said plate and projecting inwardly therefrom so as to be respectively engageable with the other one of the abutments on the distributors thereby to move said distributors concurrently to other positions in which the direction of fluid movement through the distributors is reversed.

7. A servo-motor remote control mechanism as claimed in claim 6, wherein angular adjustment of the said first plate in relation to the second plate is effected by a pinion mounted in the second plate and engaging with a toothed ring secured to the first plate, a hand knob being secured to said pinion.

8. In a mechanism for the remote control of a servo-motor of the double acting type, a shaft, means driving said shaft at a predetermined constant speed, plate means coaxial with and secured to said shaft so as to be rotated thereby, a pair of distributors mounted for angular movement about spaced axes parallel to that of the shaft and through each of which fluid under pressure is respectively supplied to and exhausted from the servo-motor, a pair of abutments on each distributor, a first pair of abutments on said plate means respectively engageable with one of the abutments of the distributors so as to move said distributors concurrently to positions in which one of them supplies fluid to the servo-motor and the other exhausts fluid therefrom, and a second pair of abutments on said plate means respectively engageable with the other one of the abutments on each distributor so as to move said distributors concurrently to other positions in which the direction of fluid movement through the distributor is reversed, and means to automatically engage said driving means with said shaft for predetermined cyclic periods.

9. In a fluid operated servo-motor remote control, a first shaft, means including a second shaft drivingly connected to said first shaft for rotating said first shaft at a predetermined constant speed, a pair of plates driven by said first shaft, a pair of angularly movable distributors through each of which fluid under pressure is supplied to and exhausted from the servo-motor, abutments on said plates engageable at predetermined positions in the movements of the plates with abutments on the distributors to periodically move the distributors so as to reverse the direction of fluid movement between each distributor and the servo-motor, a clutch on said second shaft, and means operable on adjustment of one of the abutments on one of the plates for actuating one of the distributors to disengage said clutch.

10. In a fluid operated servo-motor remote control, a first shaft, means including a second shaft drivingly connected to said first shaft for rotating the first shaft at a predetermined constant speed, a pair of plates driven by said first shaft, a pair of angularly movable distributors through each of which fluid under pressure is respectively supplied to and exhausted from the servo-motor, means for periodically coupling said plates alternately to said distributors and thereby move the latter so as to reverse the direction of fluid movement between each distributor and the servo-motor, a normally engaged clutch on said second shaft comprising two clutch members, a piston movable with one of the clutch members, and means operable on adjustment of one of the abutments on one of the plates to move one of the distributors so as to supply fluid under pressure to one side of said piston thereby to disengage the clutch.

11. A servo-motor remote control mechanism as claimed in claim 10, wherein means are provided for supplying fluid to the opposite side of a second piston rigidly connected to the first piston to restore the mechanism to continuous operation.

12. In a mechanism for the remote control of a servo-motor of the double acting type, a shaft, selectively engageable means for driving said shaft at a predetermined constant speed, plate means coaxial with and secured to said shaft so as to be rotated thereby, a pair of distributors mounted for angular movement about spaced axes parallel to that of the shaft and through each of which fluid under pressure is respectively supplied to and exhausted from the servo-motor; a pair of abutments on each distributor, a first pair of abutments on said plate means respectively engageable with one of the abutments of the distributors so as to move said distributors concurrently to positions in which one of them supplies fluid to the servo-motor and the other exhausts fluid therefrom, and a second pair of abutments on said plate means respectively engageable with the other one of the abutments on each distributor so as to move said distributors concurrently to other positions in which the direction of fluid movement through the distributor is reversed, a second means for driving said shaft, and means operable to disengage said first mentioned driving means from said shaft and connect said shaft to said second mentioned driving means.

13. In a mechanism for the remote control of a servo-motor of the double acting type, a first shaft, means including a second shaft drivingly connected to said first shaft for rotating said first shaft at a predetermined constant speed, a pair of plates coaxial with and secured to said first shaft so as to be rotated thereby, a pair of distributors mounted for angular movement about spaced axes parallel to that of said first shaft and through each of which fluid under pressure is respectively supplied and exhausted from said servo-motor, a pair of abutments on each distributor, a first pair of abutments on one of said plates respectively engageable with one of the abutments of the distributors so as to move said distributors concurrently to positions in which one of them supplies fluid to the servo-motor and the other exhausts fluid therefrom, and a second pair of abutments on the other of said plates respectively engageable with the other one of the abutments on each distributor so as to move said distributors concurrently to other positions in which the direction of fluid movement through the distributor is reversed, a clutch on said second shaft comprising two clutch members, means operable on adjustment of one of the abutments on one of the plates for actuating one of the distributors to disengage said clutch, a gear wheel movable with one of the clutch members, and a second driving means including a pinion engageable with said gear wheel on its engagement of said clutch.

14. A servo-motor remote control mechanism as claimed in claim 13 wherein the movement of the gear wheel to engage said wheel with the pinion and disengage it therefrom is effected by means operable upon adjustment of one of the abutments on one of the plates to move one of the distributors, said means comprising a piston connected to said gear and ports for admitting fluid to each side of said piston in accordance with the adjustment of said abutment.

References Cited in the file of this patent

UNITED STATES PATENTS

| Number | Name | Date |
|---|---|---|
| 881,935 | Manzel | Mar. 17, 1908 |
| 1,194,676 | Slaw | Aug. 15, 1916 |
| 1,231,628 | Lehr | July 3, 1917 |
| 1,321,105 | Kennerly | Nov. 11, 1919 |
| 1,345,686 | Metesser | July 6, 1920 |
| 1,785,998 | Brooke | Dec. 23, 1930 |
| 2,019,766 | Peterson | Nov. 5, 1935 |
| 2,113,249 | Brown | Apr. 5, 1938 |
| 2,350,763 | Jackson | June 6, 1944 |